(12) United States Patent
Urabayashi

(10) Patent No.: US 11,310,752 B2
(45) Date of Patent: *Apr. 19, 2022

(54) BASE STATION AND RADIO TERMINAL

(71) Applicant: KYOCERA Corporation, Kyoto (JP)

(72) Inventor: Hiroyuki Urabayashi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,360

(22) Filed: Jun. 11, 2020

(65) Prior Publication Data

US 2020/0305104 A1 Sep. 24, 2020

Related U.S. Application Data

(63) Continuation of application No. 16/052,399, filed on Aug. 1, 2018, which is a continuation of application No. PCT/JP2017/001185, filed on Jan. 16, 2017.

(30) Foreign Application Priority Data

Feb. 3, 2016 (JP) ................................ 2016-018856

(51) Int. Cl.
*H04W 56/00* (2009.01)
*H04L 5/00* (2006.01)
(Continued)

(52) U.S. Cl.
CPC ....... *H04W 56/0005* (2013.01); *H04L 5/0053* (2013.01); *H04L 5/0092* (2013.01); *H04L 5/0098* (2013.01); *H04L 27/26* (2013.01); *H04L 27/2613* (2013.01); *H04L 27/2666* (2013.01); *H04W 8/245* (2013.01); *H04W 56/00* (2013.01); *H04W 72/04* (2013.01); *H04W 72/0453* (2013.01)

(58) Field of Classification Search
CPC . H04W 56/00; H04W 56/0005; H04W 72/04; H04W 72/0433; H04W 8/245; H04L 5/0053; H04L 5/0092; H04L 5/0098; H04L 27/2613; H04L 27/2666

See application file for complete search history.

(56) References Cited

U.S. PATENT DOCUMENTS 10,797,809 B2 * 10/2020 Charbit ................. H04W 24/08
2005/0190735 A1    9/2005 Shinoda
(Continued)

FOREIGN PATENT DOCUMENTS

WO    2008/101762 A1    8/2008
WO    2017/038741 A1    3/2017

OTHER PUBLICATIONS

Ericsson, "Synchronization signals for 7.5 kHz subcarrier spacing", TSG-RAN WG1 #48bis, R1-071582, 1 page, Mar. 26-30, 2007, Malta.

(Continued)

*Primary Examiner* — Phong La
(74) *Attorney, Agent, or Firm* — Studebaker & Brackett PC

(57) ABSTRACT

A user equipment, an apparatus for controlling user equipment, and a method receive measurement configuration information from a first cell, the measurement configuration information indicating a subcarrier spacing applied to a second cell, and perform measurement on the second cell based on the measurement configuration information.

6 Claims, 9 Drawing Sheets

(51) Int. Cl.
*H04L 27/26* (2006.01)
*H04W 72/04* (2009.01)
*H04W 8/24* (2009.01)

(56) References Cited

U.S. PATENT DOCUMENTS

| | | | |
|---|---|---|---|
| 2006/0083159 | A1 | 4/2006 | Laroia et al. |
| 2009/0257411 | A1 | 10/2009 | Shitara |
| 2012/0015645 | A1 | 1/2012 | Moon et al. |
| 2014/0029590 | A1 | 1/2014 | Park et al. |
| 2014/0126403 | A1* | 5/2014 | Siomina ............. H04J 11/005 370/252 |
| 2014/0146732 | A1* | 5/2014 | Olufunmilola ... H04W 52/0212 370/311 |
| 2014/0169201 | A1* | 6/2014 | Tamura ............. H04L 5/0037 370/252 |
| 2015/0055584 | A1 | 2/2015 | Lee et al. |
| 2015/0223211 | A1 | 8/2015 | Seo et al. |
| 2015/0230210 | A1 | 8/2015 | Lee et al. |
| 2015/0282131 | A1 | 10/2015 | Nagata et al. |
| 2016/0066330 | A1* | 3/2016 | Centonza ......... H04W 72/0446 370/329 |
| 2016/0095076 | A1 | 3/2016 | Xiong et al. |
| 2016/0205644 | A1 | 7/2016 | Seo et al. |
| 2016/0205692 | A1* | 7/2016 | Zhang ............... H04W 48/12 370/329 |
| 2016/0242182 | A1* | 8/2016 | Chen ................. H04B 7/04 |
| 2016/0262124 | A1 | 9/2016 | Lim et al. |
| 2016/0352551 | A1* | 12/2016 | Zhang ............. H04L 27/26025 |
| 2016/0353436 | A1* | 12/2016 | Au .................. H04L 5/1469 |
| 2017/0019905 | A1* | 1/2017 | Ko .................. H04W 72/048 |
| 2017/0034741 | A1 | 2/2017 | Hahn et al. |
| 2017/0094547 | A1* | 3/2017 | Yum ................ H04W 56/001 |
| 2018/0007663 | A1* | 1/2018 | Zheng ............. H04L 5/1438 |
| 2018/0145802 | A1* | 5/2018 | Hwang ........... H04W 72/0453 |
| 2018/0249400 | A1 | 8/2018 | Harada et al. |
| 2018/0302254 | A1* | 10/2018 | Yamada ............ H04L 5/0053 |
| 2018/0309533 | A1 | 10/2018 | Yoshimoto et al. |
| 2018/0332576 | A1* | 11/2018 | Oh .................. H04W 74/08 |
| 2018/0359790 | A1* | 12/2018 | Ingale ............. H04W 28/16 |
| 2019/0013982 | A1* | 1/2019 | Sun ................. H04L 1/1854 |

OTHER PUBLICATIONS

ZTE, "Unified Synchronization Structure", 3GPP TSG RAN WG1 Meeting #86, R1-166422, Aug. 22-26, 2016, 4 Pages, Gothenburg, Sweden.

Qualcomm Technologies Inc.; The 5G Unified Air Interface; Scalable to an extreme variation of requirements; Nov. 2015; 46 pages.

Huawei et al.; Synchronization Signal Design; 3GPP TSG RAN WG1 Meeting # 83; R1-156464; Nov. 15-22, 2015; 5 pages; Anaheim, U.S.A.

ZTE; Considerations on Synchronization Signal Design of NB-IoT; 3GPP TSG RAN WG1 Meeting #82bis; R1-155994; Oct. 5-9, 2015; 4 pages; Malmo, Sweden.

Sharp; Synchronization signal design for NB-IoT; 3GPP TSG RAN WG1 Meeting #83; R1-157119; Nov. 15-22, 2015; 4 pages; Anaheim, U.S.A.

\* cited by examiner

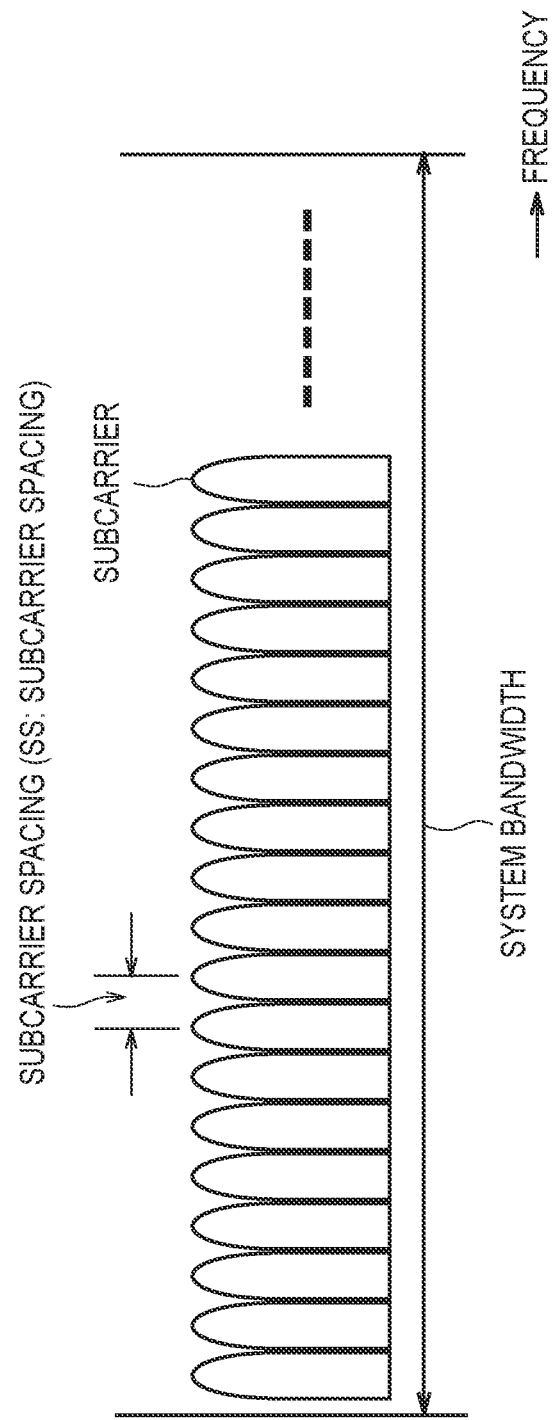

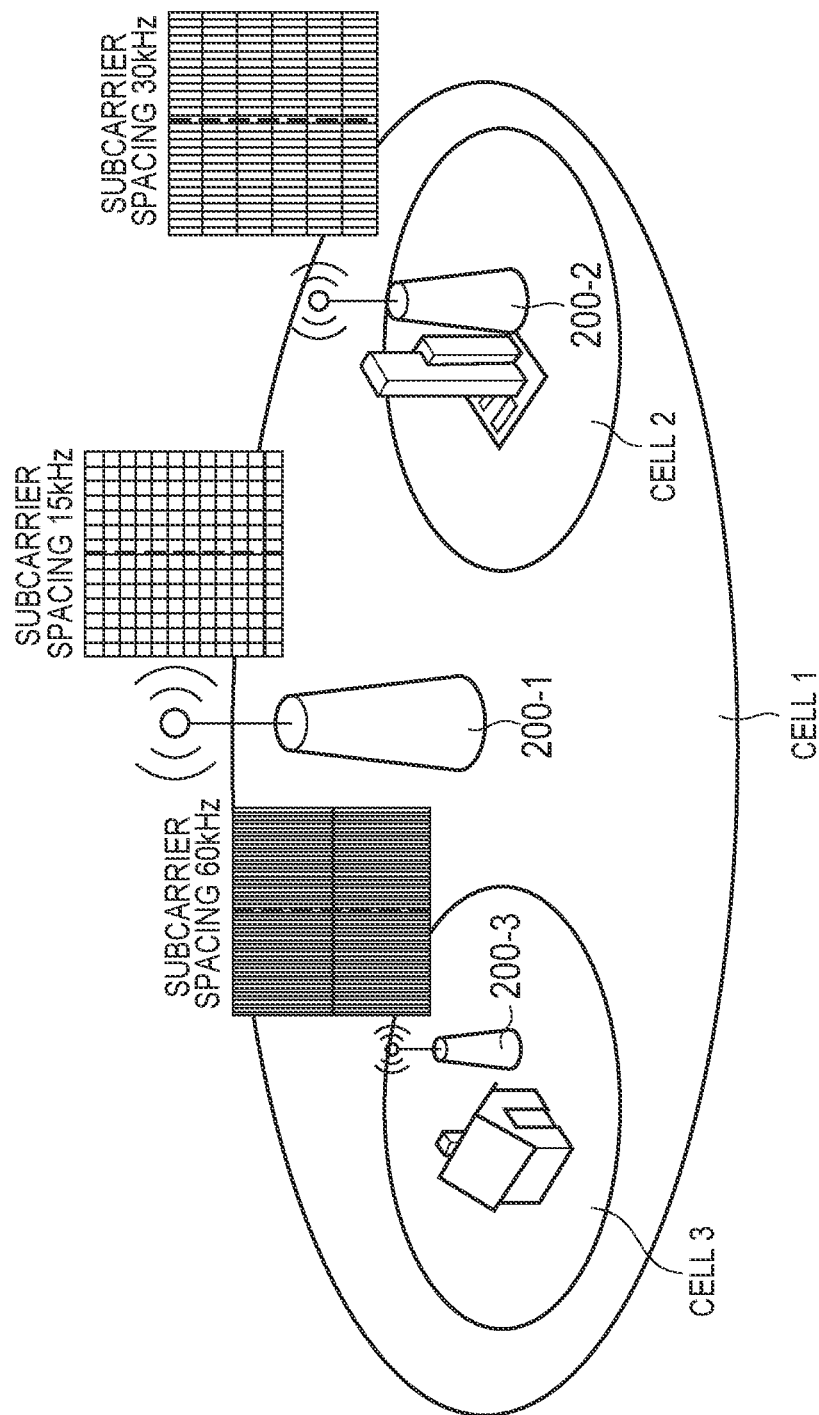

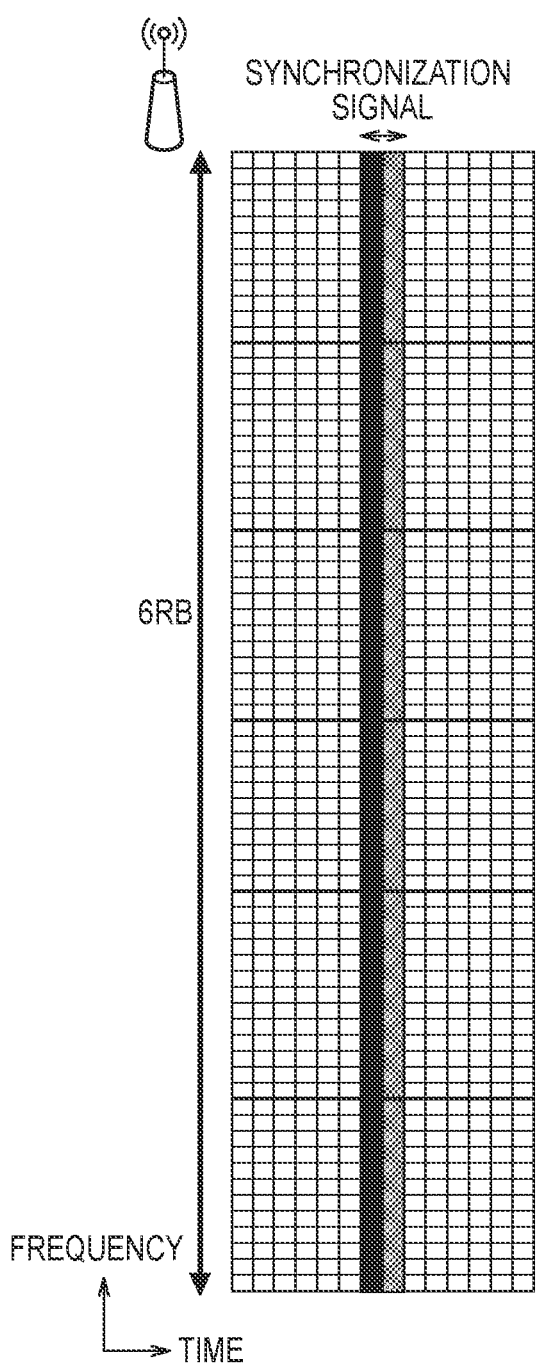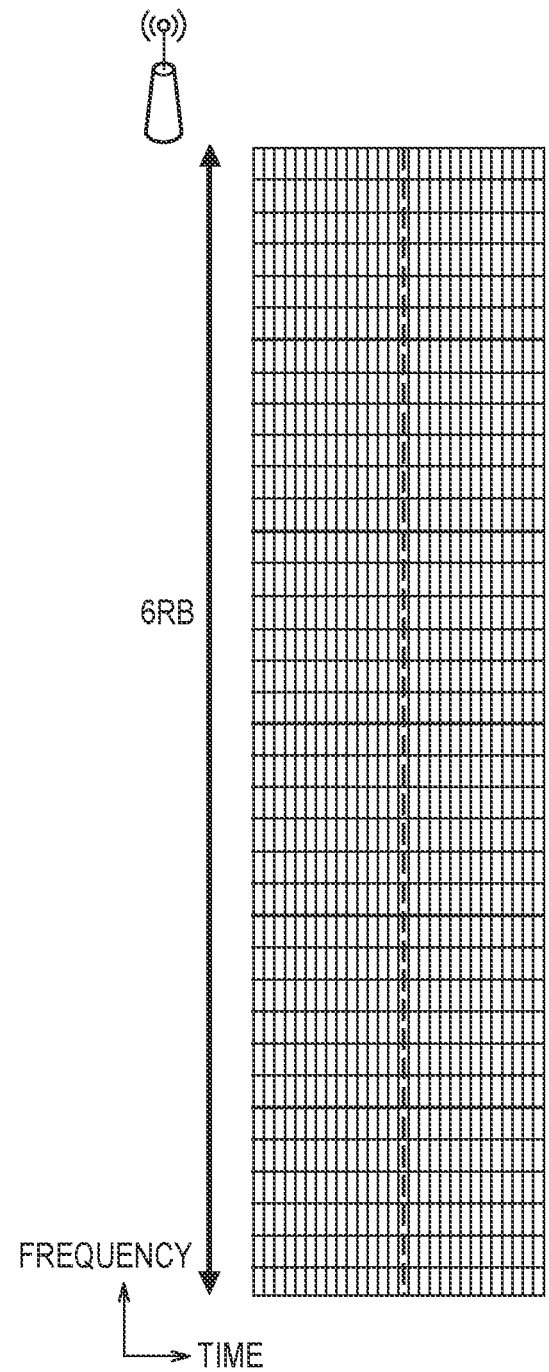

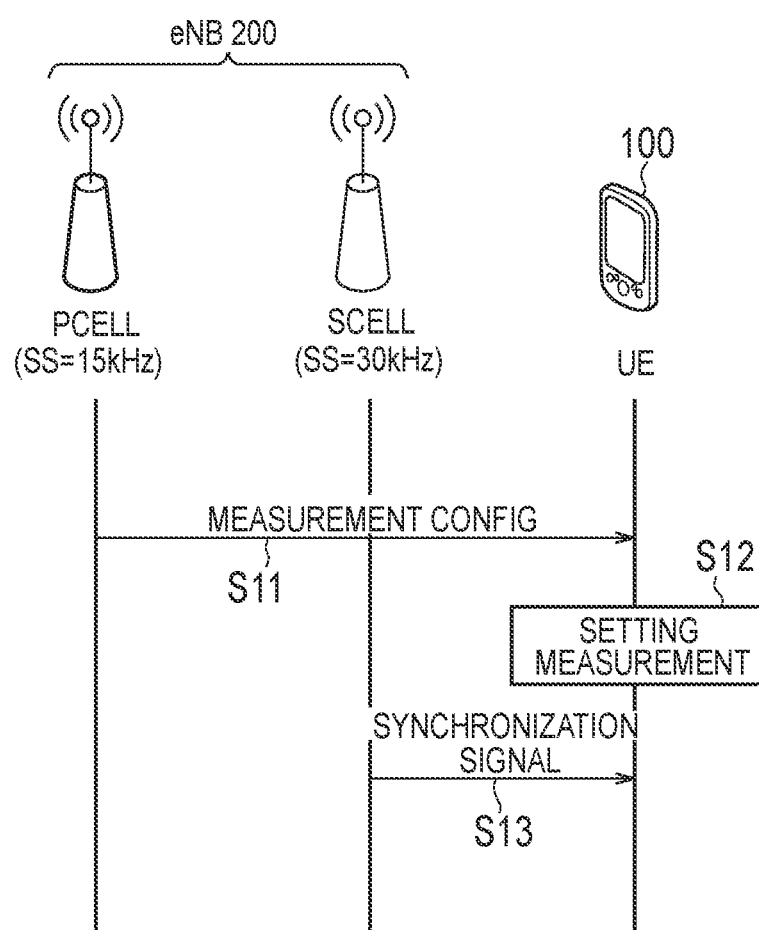

BASE STATION AND RADIO TERMINAL

CROSS-REFERENCE TO RELATED APPLICATION

The present application is a Continuation of U.S. patent application Ser. No. 16/052,399 filed Aug. 1, 2018, which is a continuation based on PCT Application No. PCT/JP2017/001185 filed on Jan. 16, 2017, which claims the benefit of Japanese Patent Application No. 2016-018856 (filed on Feb. 3, 2016). The content of which is incorporated by reference herein in their entirety.

FIELD

The present disclosure relates to a base station and a radio terminal used in a mobile communication system.

BACKGROUND

In recent years, research on a technology for the fifth generation (5G) mobile communication system is underway. One such known technology is based on OFDM (Orthogonal Frequency Division Multiple), where a frequency band and/or a radio parameter depending on a usage is scalable (variable). For example, in the existing LTE (Long Term Evolution), a subcarrier spacing (SS) is basically fixed at 15 kHz, and in a high frequency band, the subcarrier spacing is considered to be widened.

SUMMARY

A user equipment according to the present disclosure comprises a receiver configured to receive measurement configuration information from a first cell, the measurement configuration information indicating a subcarrier spacing applied to a second cell, and a controller configured to perform measurement on the second cell based on the measurement configuration information.

An apparatus for controlling a user equipment according to the present disclosure comprises a processor and a memory. The processor is configured to receive measurement configuration information from a first cell, the measurement configuration information indicating a subcarrier spacing applied to a second cell, and perform measurement on the second cell based on the measurement configuration information.

A method used in a user equipment according to the present disclosure comprises receiving measurement configuration information from a first cell, the measurement configuration information indicating a subcarrier spacing applied to a second cell, and performing measurement on the second cell based on the measurement configuration information.

BRIEF DESCRIPTION OF THE DRAWINGS

FIG. 6 is a chart illustrating an OFDM signal waveform.

FIG. 7 is a diagram illustrating an example of an assumed scenario according to first to third embodiments.

FIGS. 8A and 8B are diagrams each illustrating an example of an arrangement of a synchronization signal.

FIG. 11 is a diagram illustrating an operation example of the eNB and the UE according to the third embodiment.

DESCRIPTION OF THE EMBODIMENT

Overview of Embodiment

Figure 1:
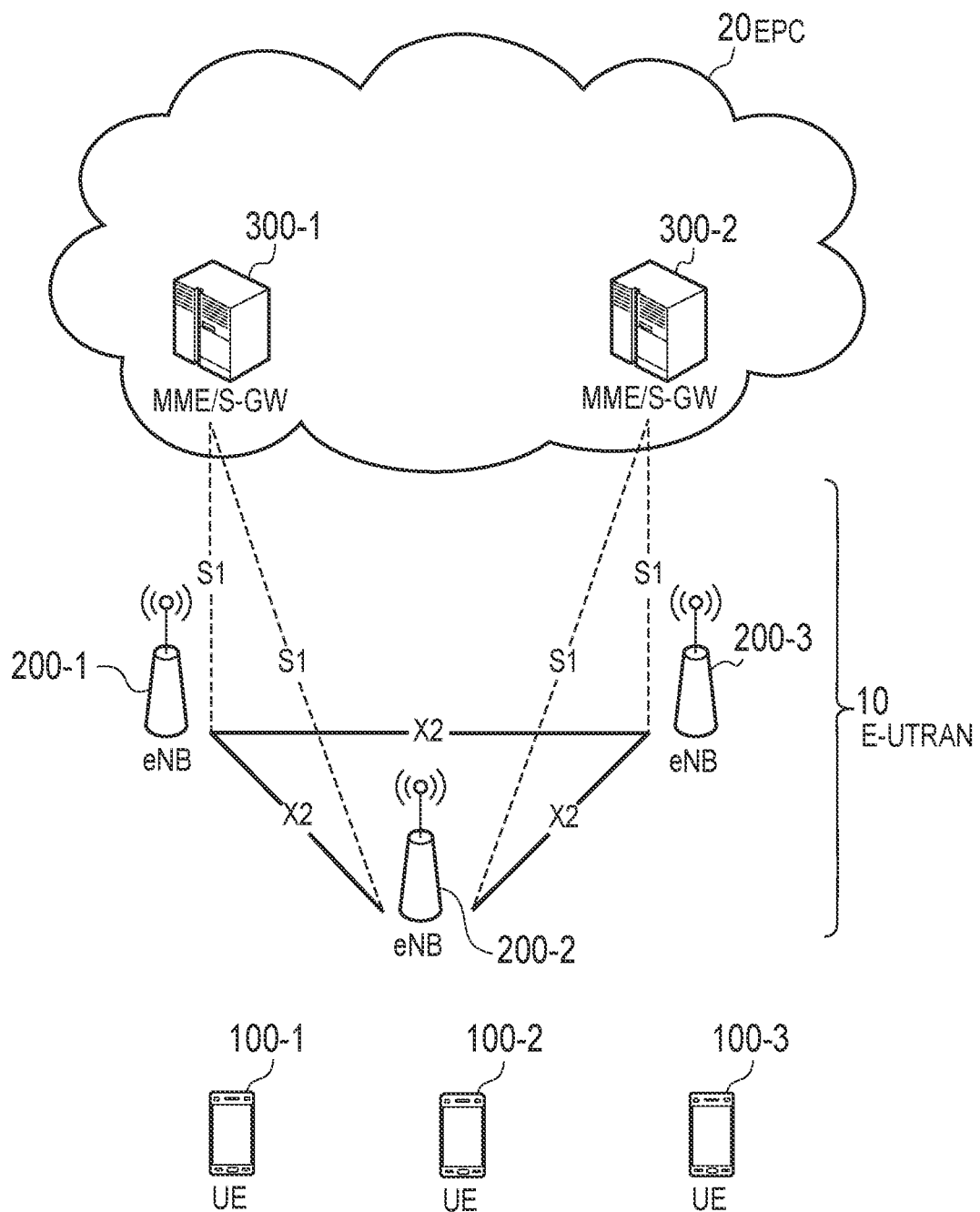
FIG. 1 is a diagram illustrating a configuration of an LTE system.

A radio terminal performs a cell search to search a synchronization signal of a cell to establish a synchronization with the cell for cell identification. Therefore, if a reception process of the synchronization signal (that is, a synchronization process) is not successful, the radio terminal cannot be synchronized with the cell nor identify the cell.

Here, if a case is assumed where the subcarrier spacing is scalable, the subcarrier spacing of the synchronization signal may also be scalable. In this case, the radio terminal may need to use all the possible subcarrier spacings to perform the synchronization process. However, such a method is not preferable from a viewpoint of a process load of the radio terminal.

Accordingly, an object of an embodiment is to provide a base station and a radio terminal capable of suppressing an increase of a process load of a radio terminal even if a subcarrier spacing is scalable.

A base station according to a first embodiment comprises a transmitter configured to transmit a synchronization signal in a cell using a predetermined subcarrier spacing, the cell being managed by the base station; and a controller configured to arrange, based on the predetermined subcarrier spacing, the synchronization signal in a plurality of discrete subcarriers not continuous in a frequency direction.

In the first embodiment, the controller may arrange the synchronization signal in the plurality of discrete subcarriers, if the predetermined subcarrier spacing is narrower than a previously set specified subcarrier spacing. In the plurality of discrete subcarriers, a spacing between the two adjacent discrete subcarriers is equal to the specified subcarrier spacing.

In the first embodiment, the specified subcarrier spacing is may be subcarrier spacing used by a radio terminal for a reception process of the synchronization signal.

In the first embodiment, the synchronization signal may include a signal sequence indicating the predetermined subcarrier spacing.

A base station according to a second embodiment comprises a transmitter configured to transmit a synchronization signal in a cell using a predetermined subcarrier spacing, the cell being managed by the base station; and a controller configured to apply a subcarrier spacing different from the predetermined subcarrier spacing to a time location for transmitting the synchronization signal.

In the second embodiment, if the predetermined subcarrier spacing is different from a previously set specified subcarrier spacing, the controller may apply the specified subcarrier spacing to a time location for transmitting the synchronization signal.

In the second embodiment, the specified subcarrier spacing may be a subcarrier spacing used by a radio terminal for a reception process of the synchronization signal.

In the second embodiment, the synchronization signal may include a signal sequence indicating the predetermined subcarrier spacing.

A radio terminal according to the first and second embodiment comprises a receiver configured to receive a synchronization signal of a cell of a base station; and a controller configured to perform a reception process of the synchronization signal by using a previously set specified subcarrier spacing, irrespective of a subcarrier spacing of the cell.

In the first and second embodiments, the synchronization signal may include a signal sequence indicating a subcarrier spacing of the cell. The controller may recognize, based on the signal sequence, the subcarrier spacing of the cell.

A base station according to a third embodiment comprises a transmitter configured to transmit, in a first cell, subcarrier spacing information to a radio terminal. The subcarrier spacing information indicates a subcarrier spacing of a second cell different from the first cell.

In the third embodiment, the first cell may be a primary cell of the radio terminal. The second cell may be a secondary cell of the radio terminal.

A radio terminal according to the third embodiment comprises a receiver configured to receive, in the first cell, subcarrier spacing information from a base station, where the subcarrier spacing information indicates a subcarrier spacing of a second cell different from the first cell; and a controller configured to recognize, based on the subcarrier spacing information, the subcarrier spacing of the second cell.

In the third embodiment, the controller may perform a reception process of a synchronization signal of the second cell by using the recognized subcarrier spacing.

[Mobile Communication System]

The configuration of the mobile communication system according to the embodiment will be described. In the embodiment, it is assumed that a 5G mobile communication system is a system that has evolved the LTE system.

(1) Configuration of System

FIG. 1 is a diagram illustrating a configuration of an LTE system. As illustrated in FIG. 1, the LTE system includes a User Equipment (UE) 100, an Evolved-UMTS Terrestrial Radio Access Network (E-UTRAN) 10, and an Evolved Packet Core (EPC) 20. The E-UTRAN 10 and the EPC 20 constitute a network of the LTE system.

The UE 100 corresponds to a radio terminal. The UE 100 is a mobile communication terminal. The UE 100 performs radio communication with a cell (serving cell). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The EPC 20 corresponds to a core network. The EPC 20 includes an MME (Mobility Management Entity)/S-GW (Serving-Gateway) 300. The MME performs various mobility control and the like for the UE 100. The S-GW performs data transfer control. The MME/S-GW 300 is connected to the eNB 200 via an S1 interface. The E-UTRAN 10 and the EPC 20 constitute a network.

Figure 2:
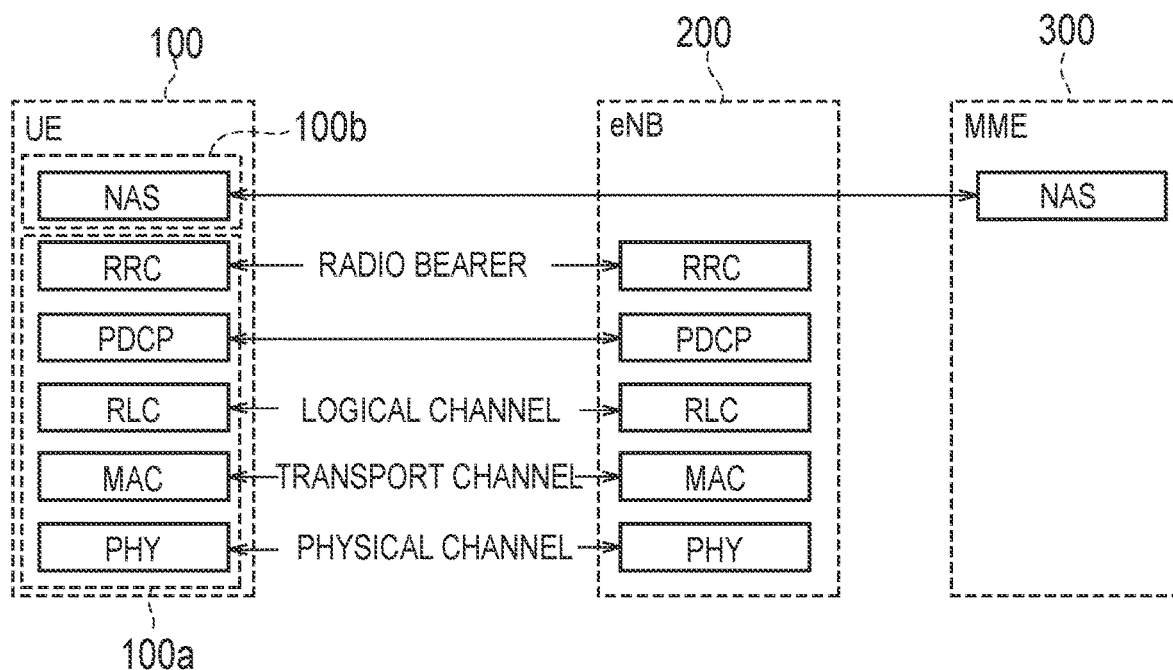
FIG. 2 is a diagram illustrating a protocol stack of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer, the MAC layer, the RLC layer, the PDCP layer, and the RRC layer constitute an AS (Access Stratum) entity 100a. The upper layer entity 100b is positioned higher than the AS entity 100a. The upper layer entity 100b includes an NAS (Non-Access Stratum) layer. The upper layer entity 100b may further include an application layer or the like.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler. The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, signaling (RRC signaling) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected mode. If there is not a connection (RRC connection) between the RRC of the UE 100 and the RRC of the eNB 200, the UE 100 is in an RRC idle mode.

A non-access stratum (NAS) layer located above the RRC layer performs, for example, session management, mobility management, and the like.

Figure 3:
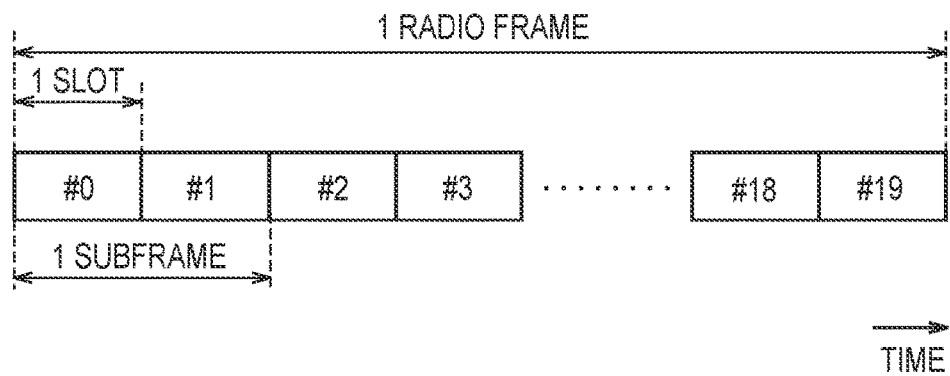
FIG. 3 is a diagram illustrating a configuration of a radio frame used in the LTE system.

FIG. 3 is a configuration diagram of a radio frame used in the LTE system. In the LTE system, Orthogonal Frequency Division Multiple Access (OFDMA) is applied to downlink, Single Carrier Frequency Division Multiple Access (SC-FDMA) is applied to uplink, respectively.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Among the radio resources (time/frequency resources) allocated to the UE 100, frequency resources can be specified by resource blocks, and time resources can be specified by subframes (or slots).

(2) Configuration of Radio Terminal

Figure 4:
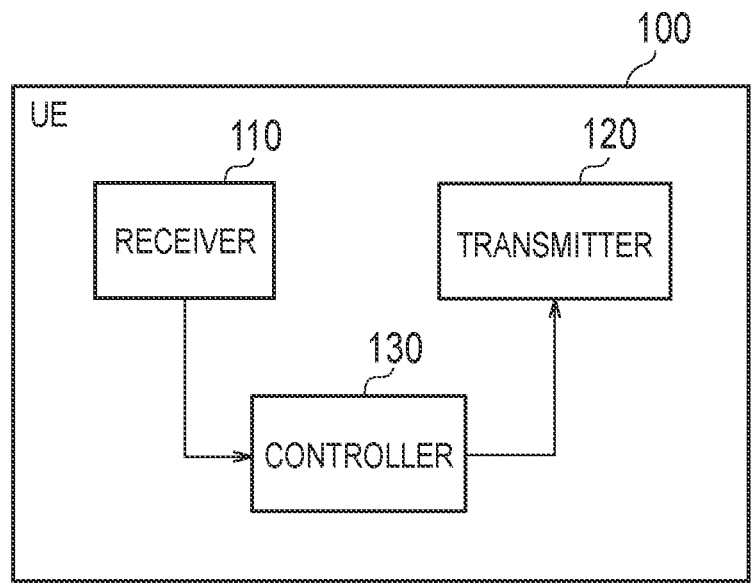
FIG. 4 is a diagram illustrating a configuration of a UE (radio terminal).

FIG. 4 is a diagram illustrating configuration of the UE 100 (radio terminal). As illustrated in FIG. 4, the UE 100 includes a receiver 110, a transmitter 120, and a controller 130.

The receiver 110 performs various types of reception under the control of the controller 130. The receiver 110 includes an antenna and a receiving device. The receiving device converts a radio signal received by the antenna, into a baseband signal (reception signal). The receiving device outputs the baseband signal to the controller 130.

The transmitter 120 performs various types of transmission under the control of the controller 130. The transmitter 120 includes an antenna and a transmission device. The transmission device converts a baseband signal (transmission signal) output by the controller 130, into a radio signal. The transmission device transmits the radio signal from the antenna.

The controller 130 performs various types of control in the UE 100. The controller 130 includes a processor and a memory. The memory stores a program to be executed by the processor, and information to be used in processing performed by the processor. The processor may include a baseband processor and a central processing unit (CPU). The baseband processor performs modulation/demodulation and encoding/decoding of a baseband signal, and the like. The CPU executes programs stored in the memory, to perform various types of processing. The processor may include a codec that performs encoding/decoding of an audio/video signal. The processor executes the above-described various processes and various processes to be described later.

(3) Configuration of Base Station

Figure 5:
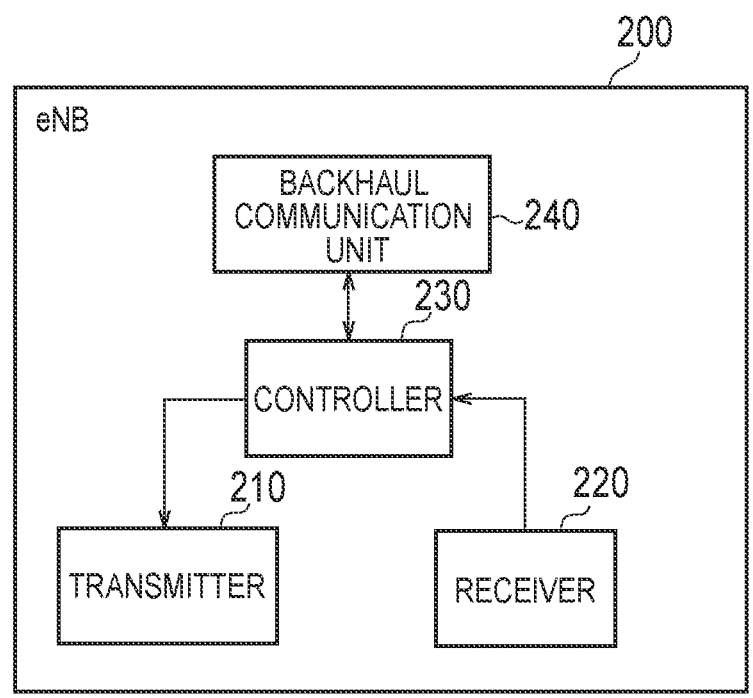
FIG. 5 is a diagram illustrating a configuration of an eNB (base station).

FIG. 5 is a diagram illustrating configuration of the eNB 200 (base station). As illustrated in FIG. 5, the eNB 200 includes a transmitter 210, a receiver 220, a controller 230, and a backhaul communication unit 240.

The transmitter 210 performs various types of transmission under the control of the controller 230. The transmitter 210 includes an antenna and a transmission device. The transmission device converts a baseband signal (transmission signal) output by the controller 230, into a radio signal. The transmission device transmits the radio signal from the antenna.

The receiver 220 performs various types of reception under the control of the controller 230. The receiver 220 includes an antenna and a receiving device. The receiving device converts a radio signal received by the antenna, into a baseband signal (reception signal). The receiving device outputs the baseband signal to the controller 230.

The controller 230 performs various types of control in the eNB 200. The controller 230 includes a processor and a memory. The memory stores a program to be executed by the processor, and information to be used in processing performed by the processor. The processor may include a baseband processor and a central processing unit (CPU). The baseband processor performs modulation/demodulation and encoding/decoding of a baseband signal, and the like. The CPU executes programs stored in the memory, to perform various types of processing. The processor executes the processor to be described later.

The backhaul communication unit 240 is connected with an adjacent eNB 200 via the X2 interface. The backhaul communication unit 240 is connected with the MME/S-GW 300 via the S1 interface. The backhaul communication unit 240 is used for communication performed on the X2 interface, communication performed on the S1 interface, and the like.

First Embodiment

A first embodiment will be described, below.

(1) Assumed Scenario

In the first embodiment, a scenario is assumed where the subcarrier spacing (SS) is scalable in an OFDM-based signal transmission.

FIG. 6 is a chart illustrating an OFDM signal waveform. As illustrated in FIG. 6, the OFDM transmission is a type of a multicarrier modulation scheme where data is distributed to a plurality of orthogonal subcarriers and the data is transmitted in parallel in a frequency direction. The subcarrier spacing indicates a spacing between two adjacent subcarriers. Further, not only the subcarrier spacing but also a system bandwidth and/or OFDM symbol length may be scalable. For example, the subcarrier spacing may be widened, and the OFDM symbol length may be shortened.

FIG. 7 is a diagram illustrating an example of an assumed scenario according to the first embodiment. As illustrated in FIG. 7, an eNB 200-1 manages a cell 1, an eNB 200-2 manages a cell 2, and an eNB 200-3 manages a cell 3. Here, an example is provided where one eNB 200 manages one cell, however, one eNB 200 may manage a plurality of cells.

In the first embodiment, a case is primarily assumed where depending on an operation environment of each cell, a different subcarrier spacing is applied. In the example of FIG. 7, the cell 1 is a macro cell where a subcarrier spacing of 15 kHz is applied. Further, the cell 2 is a small cell for an outdoor use, where a subcarrier spacing of 30 kHz is applied. The cell 3 is a small cell for an indoor use, where a subcarrier spacing of 60 kHz is applied.

FIGS. 8A and 8B are diagrams each illustrating an example of an arrangement of a synchronization signal. It is noted that in a resource grid illustrated in FIGS. 8A and 8(b) and subsequent figures, one section in a vertical direction indicates one subcarrier, and one section in a lateral direction indicates one OFDM symbol.

As illustrated in FIG. 8A, in an existing LTE system, the subcarrier spacing (SS) is 15 kHz. The synchronization signal is arranged, in the frequency direction, in six resource blocks (6RBs) in the center of the system bandwidth. Specifically, the synchronization signal is arranged in a plurality of continuous subcarriers. In a time direction, the synchronization signal is arranged in a previously set time location. In the existing LTE system, the synchronization signal includes a primary synchronization signal arranged in the last OFDM symbol of a first-half slot for each five subframes, and a secondary synchronization signal arranged in the next-to-last (that is, immediately before the primary synchronization signal) OFDM symbol in the same slot as the primary synchronization signal. It is noted that when the synchronization signal is applied to the 5G system, an arrangement similar to that in the existing LTE system may not always be established.

By performing a cell search for searching the synchronization signal of the cell, the UE 100 establishes the synchronization with the cell for cell identification. Therefore, if a reception process of the synchronization signal (that is, a synchronization process) is not successful, the UE 100 cannot be synchronized with the cell nor identify the cell.

As illustrated in FIG. 8B, when the subcarrier spacing is scalable, the subcarrier spacing (SS) is 30 kHz, for example. As compared with FIG. 8A, the subcarrier spacing is doubled, and the OFDM symbol length is one half. If the subcarrier spacing is scalable, the subcarrier spacing of the synchronization signal may also be scalable. Therefore, the UE 100 may need to perform a synchronization process by using all of the possible subcarrier spacings. However, such a method is not preferable from a viewpoint of a process load of the UE 100.

(2) Operation According to First Embodiment

The eNB 200 according to the first embodiment includes a transmitter 210 configured to transmit a synchronization signal in a cell using a predetermined subcarrier spacing, the cell being managed by the eNB 200, and a controller 230 configured to arrange, based on the predetermined subcarrier spacing, the synchronization signal in a plurality of subcarriers (hereinafter, "discrete subcarriers") not continuous in the frequency direction. The time location to arrange the synchronization signal is previously set. That is, the eNB 200 may transmit the synchronization signal on a symbol arranged in the same time location, irrespective of the subcarrier spacing.

In the first embodiment, the controller 230 arranges the synchronization signal in the discrete subcarrier, if the predetermined subcarrier spacing is narrower than a previously set specified subcarrier spacing. Specifically, in a scenario where there are a plurality of cells different in subcarrier spacing, the widest subcarrier spacing is previously set as the specified subcarrier spacing. Further, in the discrete subcarrier, a spacing between the two adjacent discrete subcarriers is equal to the specified subcarrier spacing. The specified subcarrier spacing is a subcarrier spacing used by the UE 100 for the reception process of the synchronization signal. The synchronization signal includes a signal sequence (code sequence) indicating a predetermined subcarrier spacing.

The UE 100 according to the first embodiment includes a receiver 110 configured to receive the synchronization signal of the eNB 200; and a controller 130 configured to perform the reception process of the synchronization signal by using the previously set specified subcarrier spacing, irrespective of the subcarrier spacing of the cell. The controller 130 may perform the reception process of the synchronization signal in a previously set time location. The controller 130 recognizes, based on the signal sequence of the received synchronization signal, the subcarrier spacing of the cell from which the synchronization signal is transmitted.

Figure 9:
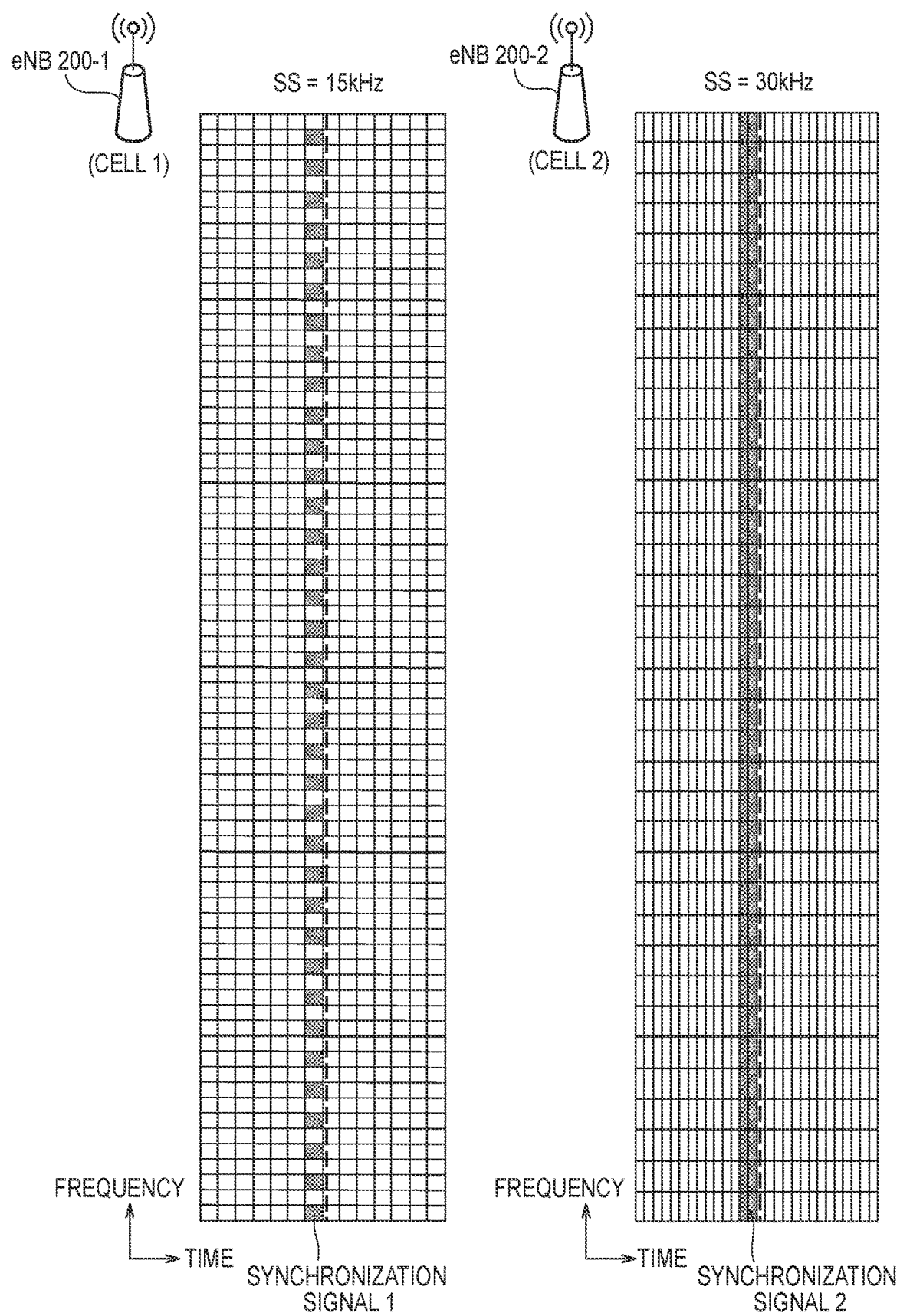
FIG. 9 is a diagram illustrating an operation example of the eNB according to the first embodiment.

FIG. 9 is a diagram illustrating an operation example of the eNB 200 according to the first embodiment. Here, a case is assumed where there are a cell 1 with the subcarrier spacing (SS) being 15 kHz and a cell 2 with the subcarrier spacing (SS) being 30 kHz. The cell 1 and the cell 2 may be managed by the same eNB 200, and may be managed by a different eNB 200. In FIG. 9, an example is illustrated where the cell 1 is managed by the eNB 200-1, and the cell 2 is managed by the eNB 200-2.

The eNB 200-1 transmits a synchronization signal 1, in the cell 1 using the subcarrier spacing of 15 kHz. The synchronization signal 1 includes a signal sequence 1 indicating 15 kHz. The eNB 200-2 transmits a synchronization signal 2, in the cell 2 using the subcarrier spacing of 30 Hz. The synchronization signal 2 includes a signal sequence 2 indicating 30 kHz. In the example of FIG. 9, the subcarrier spacing of 30 Hz corresponds to the previously set specified subcarrier spacing.

The eNB 200-1 arranges the synchronization signal 1 in the discrete subcarrier because the subcarrier spacing of the cell 1 is narrower than the specified subcarrier spacing. On the other hand, the eNB 200-2 arranges the synchronization signal 2 in a plurality of subcarriers (continuous subcarriers) continuous in the frequency direction. The eNB 200-1 and the eNB 200-2 arrange the synchronization signals 1, 2 in a time location at an equal time location (predetermined symbol interval).

In the discrete subcarrier where the eNB 200-1 arranges the synchronization signal 1, the spacing between the two adjacent discrete subcarriers is equal to the specified subcarrier spacing. Specifically, the eNB 200-1 arranges the synchronization signal 1 with a ratio of one subcarrier in every two subcarriers. As a result, the spacing of the subcarrier where the synchronization signal 1 is arranged is equal to 30 kHz (specified subcarrier spacing).

The UE 100 uses 30 kHz or previously set specified subcarrier spacing to perform the reception process of the synchronization signal (synchronization process) at the previously set time location. Accordingly, with a similar signal process, the UE 100 can receive and demodulate the synchronization signal 1 of the cell 1 and the synchronization signal 2 of the cell 2. In other words, the UE 100 can receive and demodulate also the synchronization signal 1 of the cell 1, with the signal process similar to the signal process used for the synchronization signal 2 of the cell 2.

Then, the UE 100 recognizes, based on the signal sequence of the received synchronization signal, the subcarrier spacing of the cell. For example, the UE 100 recognizes, based on the signal sequence 1 of the synchronization signal 1 received from the cell 1, that the subcarrier spacing of the cell 1 is 15 kHz. Further, the UE 100 recognizes, based on the signal sequence 2 of the synchronization signal 2 received from the cell 2, that the subcarrier spacing of the cell 2 is 30 kHz.

After recognizing the subcarrier spacing of the cell, the UE 100 performs the reception process of another signal by using the subcarrier spacing. The other signal is, for example, a cell-specific reference signal and system information (a master information block, a system information blocks or the like). The UE 100 can start communication with the cell by receiving these signals.

(3) Summary of First Embodiment

According to the first embodiment, the eNB 200-1 arranges the synchronization signal 1 in the discrete subcarrier so that the subcarrier spacing of the synchronization signal 1 is the specified subcarrier spacing (30 kHz). As a result, the UE 100 can perform the synchronization process with the cell 1 by using the specified subcarrier spacing (30 kHz). That is, with a standardized synchronization process, the UE 100 can receive the synchronization signal 1 of the cell 1 and the synchronization signal 2 of the cell 2 cell 1. Therefore, even if the subcarrier spacing is scalable, it is possible to suppress an increase of a process load of the UE 100.

(4) First Modification of First Embodiment

In the first embodiment described above, the example was described where if there are the cell 1 with the subcarrier spacing (SS) being 15 kHz and the cell 2 with the subcarrier spacing (SS) being 30 kHz, the subcarrier spacing of 30 kHz is previously defined as the specified subcarrier spacing. However, in a case where there are the cell 1 with the subcarrier spacing (SS) being 15 kHz, the cell 2 with the subcarrier spacing (SS) being 30 kHz, and the cell 3 with the subcarrier spacing (SS) being 60 kHz, the subcarrier spacing of 60 kHz may be previously defined as the specified subcarrier spacing.

(5) Second Modification of First Embodiment

In the first embodiment described above, a setting method of the specified subcarrier spacing was not particularly mentioned. However, the specified subcarrier spacing may be previously defined by a system specification. Similarly, the time location where the synchronization signal is arranged may also be previously defined.

Alternatively, the specified subcarrier spacing may be set and updated to the UE 100 and the eNB 200 by the signaling from the core network or OAM (Operations Administration and Maintenance). Similarly, the time location where the synchronization signal is arranged may also be set and updated to the UE 100 and the eNB 200 by the signaling from the core network or the OAM.

Second Embodiment

A second embodiment will be described while focusing on a difference from the first embodiment, below. An assumed scenario according to the second embodiment is similar to the assumed scenario according to the first embodiment.

(1) Operation According to Second Embodiment

The eNB 200 according to the second embodiment includes, a transmitter 210 configured to transmit a synchronization signal in the cell using a predetermined subcarrier spacing, the cell being managed by the eNB 200, and a controller 230 configured to apply a subcarrier spacing different from the predetermined subcarrier spacing to a time location for transmitting the synchronization signal. In other words, in the second embodiment, the eNB 200 applies the subcarrier spacing different from another time location (that is, a subcarrier for transmitting data), only to the time location of the synchronization signal. Specifically, if the predetermined subcarrier spacing is different from the previously set specified subcarrier spacing, the controller 230 applies the specified subcarrier spacing to the time location for transmitting the synchronization signal. Further, similarly to the first embodiment, the time location where the synchronization signal is to be arranged may be previously set. The synchronization signal includes the signal sequence indicating the predetermined subcarrier spacing.

A method of defining and setting the specified subcarrier spacing is similar to those in the first embodiment and the modification thereof. That is, the specified subcarrier spacing is the subcarrier spacing used by the UE 100 for the reception process of the synchronization signal. An operation of the UE 100 is similar to that in the first embodiment.

Figure 10:
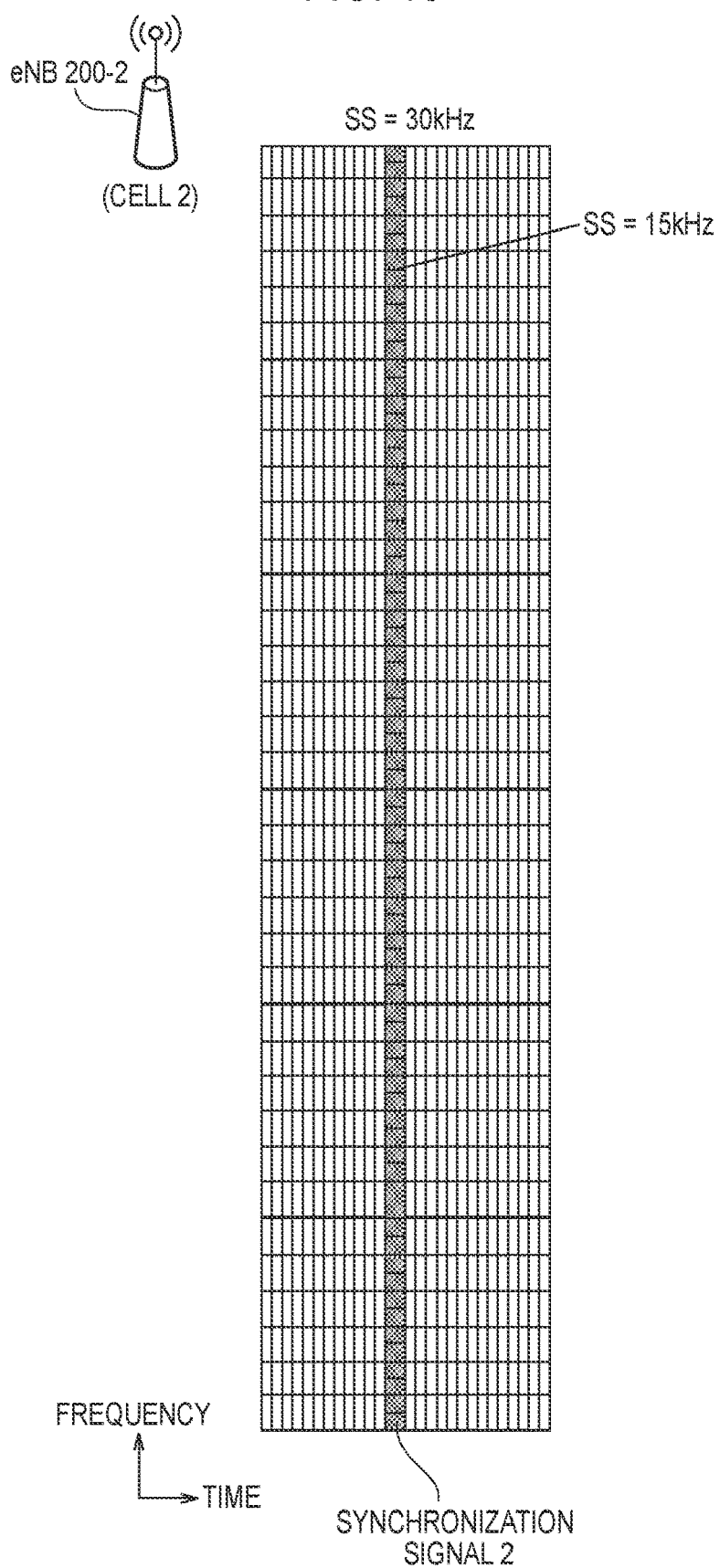
FIG. 10 is a diagram illustrating an operation example of the eNB according to the second embodiment.

FIG. 10 is a diagram illustrating an operation example of the eNB 200 according to the second embodiment. Here, a case is illustrated where if there is the cell 2 with the subcarrier spacing (SS) being 30 kHz, the specified subcarrier spacing is 15 kHz. The cell 2 is managed by the eNB 200-2. As illustrated in FIG. 10, the eNB 200-2 transmits the synchronization signal 2, in the cell 2 using the subcarrier spacing of 30 kHz. The eNB 200-2 applies the subcarrier spacing of 15 kHz to the time location for transmitting the synchronization signal 2. Further, the eNB 200-2 arranges the synchronization signal 2 into the previously set time location.

The UE 100 uses 15 kHz or previously set specified subcarrier spacing to perform the reception process of the synchronization signal 2 (synchronization process) at the previously set time location. Then, the UE 100 recognizes, based on the signal sequence of the received synchronization signal 2, the subcarrier spacing (30 kHz) of the cell 2. After recognizing the subcarrier spacing of the cell 2, the UE 100 performs the reception process of another signal of the cell 2 by using the subcarrier spacing. The UE 100 can start communication with the cell 2 by receiving these signals.

(2) Summary of Second Embodiment

According to the second embodiment, the eNB 200 applies the subcarrier spacing (15 kHz or specified subcarrier spacing) different from the other time location (that is, the subcarrier for transmitting the data), only to the time location of the synchronization signal. As a result, with a standardized synchronization process, the UE 100 can receive the synchronization signal of each cell. Therefore, even if the subcarrier spacing is scalable, it is possible to suppress an increase of a process load of the UE 100.

Third Embodiment

A third embodiment will be described while focusing on differences from the first, second embodiments, below. An assumed scenario according to the third embodiment is similar to the assumed scenario according to the first embodiment.

(1) Operation According to Third Embodiment

The eNB 200 according to the third embodiment includes a transmitter 210 configured to transmit, in the first cell, subcarrier spacing information, to the UE 100. The subcarrier spacing information indicates the subcarrier spacing of the second cell different from the first cell. The first cell may be a primary cell (PCell) of the UE 100 and the second cell may be a secondary cell (SCell) of the UE 100. The PCell may be a cell similar to an existing LTE cell, and the SCell may be a cell of the 5G mobile communication system.

The UE 100 according to the third embodiment includes a receiver 110 configured to receive, in the first cell, the subcarrier spacing information from the eNB 200, and a controller 230 configured to recognize, based on the subcarrier spacing information, the subcarrier spacing of the second cell. The controller 230 performs the reception process of the synchronization signal of the second cell by using the recognized subcarrier spacing.

FIG. 11 is a chart illustrating an operation example of the eNB 200 and the UE 100 according to the third embodiment. Here, an example is illustrated where the first cell (PCell) and the second cell (SCell) are managed by the same eNB 200. In the example of FIG. 11, the subcarrier spacing of the first cell (PCell) is 15 kHz and the subcarrier spacing of the second cell (SCell) is 30 kHz. In an initial state of FIG. 11, the UE 100 has a connection with the first cell (PCell), but does not have a connection with the second cell (SCell).

As illustrated in FIG. 11, in step S11, the eNB 200 transmits, in the first cell (PCell), measurement configuration information (Measurement Config) including the subcarrier spacing information indicating the subcarrier spacing of the second cell (SCell), to the UE 100. The measurement configuration information is transmitted by a dedicated RRC signaling. However, the measurement configuration information may be transmitted by a broadcast signaling. The measurement configuration information may include not only the subcarrier spacing information but also information indicating a center frequency of the second cell (SCell). Further, the measurement configuration information may include information indicating a service (that is, use of the cell 2) provided by the second cell (SCell).

In step S12, the UE 100 starts, based on the received measurement configuration information, the measurement on the second cell (SCell). Here, the UE 100 recognizes the subcarrier spacing of the second cell (SCell), based on the subcarrier spacing information included in the measurement configuration information.

In step S13, the eNB 200 transmits, in the second cell (SCell), the synchronization signal. The UE 100 uses the subcarrier spacing recognized in step S12 to perform the reception process of the synchronization signal of the second cell (SCell).

Thereafter, the UE 100 performs the measurement on the reference signal and the like of the second cell (SCell), and transmits the measurement result to the first cell (PCell). The eNB 200 transmits, based on the measurement result, configuration information for adding the second cell as the SCell, to the UE 100. Accordingly, the UE 100 performs a carrier aggregation simultaneously using the first cell (PCell) and the second cell (SCell).

(2) Summary of Second Embodiment

According to the third embodiment, one cell previously notifies the UE 100 of the subcarrier spacing of another cell. As a result, the UE 100 can easily receive the synchronization signal of the other cell. Therefore, even if the subcarrier spacing is scalable, it is possible to suppress an increase of a process load of the UE 100.

(3) Modification of Third Embodiment

In the third embodiment described above, an example was described where the subcarrier spacing information is transmitted from the first cell (PCell) to the UE 100 by the dedicated signaling. However, the subcarrier spacing information may be transmitted by the broadcast signaling from the first cell (PCell). Further, the subcarrier spacing information may be a list of the subcarrier spacings of a plurality of cells. The list includes a plurality of entries, and each entry may include an identifier of a cell and the subcarrier spacing of the cell.

Further, in the third embodiment described above, an example was described where the first cell and the second cell are managed by the same eNB 200. However, the first cell may be managed by the eNB 200-1 and the second cell may be managed by the eNB 200-2. In this case, instead of the carrier aggregation, a Dual connectivity may be performed. In the Dual connectivity, the second cell may be referred to as "primary secondary cell (PSCell)". Further, prior to the sequence of FIG. 11, the eNB 200-2 may notify the eNB 200-1, via a backhaul, of the subcarrier spacing of the cell 2. For example, the eNB 200-2 notifies the eNB 200-1, on the X2 interface or the S1 interface, of the subcarrier spacing of the cell 2.

Other Embodiments

Each of the above-described first to third embodiments may be performed individually and may also be performed by combining two or more of the embodiments.

In the embodiments described above, it was assumed that the 5G mobile communication system is a system evolved from the LTE system. However, the 5G mobile communication system includes the LTE and a new radio access technology (new RAT). The present disclosure may be applied to a mobile communication system where such a new radio access technology is used.

APPENDANT

(11) A base station, comprising: a transmitter configured to transmit, in a first cell, subcarrier spacing information to a radio terminal, wherein the subcarrier spacing information indicates a subcarrier spacing of a second cell different from the first cell.

(12) The base station according to (11), wherein the first cell is a primary cell of the radio terminal, and the second cell is a secondary cell of the radio terminal.

(13) A radio terminal, comprising: a receiver configured to receive, in the first cell, subcarrier spacing information from a base station, where the subcarrier spacing information indicates a subcarrier spacing of a second cell different from the first cell; and a controller configured to recognize, based on the subcarrier spacing information, the subcarrier spacing of the second cell.

(14) The radio terminal according to claim 13, wherein the controller performs a reception process of a synchronization signal of the second cell by using the recognized subcarrier spacing.

INDUSTRIAL APPLICABILITY

The present disclosure is useful in the field of radio communication.

The invention claimed is:
1. A user equipment comprising:
a receiver configured to receive measurement configuration information broadcasted from a first cell, the measurement configuration information indicating a plurality of subcarrier spacings each applied to a second cell of a plurality of second cells, the plurality of subcarrier spacings includes at least a first subcarrier spacing higher than 15 kHz, the first subcarrier spacing applied to downlink transmission of the second cell; and a controller configured to perform measurement on each of the second cells based on the measurement configuration information.

2. An apparatus for controlling a user equipment, the apparatus comprising:

a processor and a memory, the processor configured to receive measurement configuration information broadcasted from a first cell, the measurement configuration information indicating a plurality of subcarrier spacings each applied to a second cell of a plurality of second cells, the plurality of subcarrier spacings includes at least a first subcarrier spacing higher than 15 kHz, the first subcarrier spacing applied to downlink transmission of the second cell; and perform measurement on each of the second cells based on the measurement configuration information.

3. A method used in a user equipment, the method comprising:

receiving measurement configuration information broadcasted from a first cell, the measurement configuration information indicating a plurality of subcarrier spacings each applied to a second cell of a plurality of second cells, the plurality of subcarrier spacings includes at least a first subcarrier spacing higher than 15 kHz, the first subcarrier spacing applied to downlink transmission of the second cell; and performing measurement on each of the second cells based on the measurement configuration information.

4. The user equipment according to claim 1, wherein the measurement configuration information includes information identifying the second cells.

5. The user equipment according to claim 1, wherein the controller is configured to report measurement results on each of the second cells, to the first cell.

6. The user equipment according to claim 1, wherein the plurality of subcarrier spacings further includes at least a second subcarrier spacing higher than 30 kHz.

* * * * *